United States Patent [19]
Millevoi et al.

[11] Patent Number: 4,988,471
[45] Date of Patent: Jan. 29, 1991

[54] APPARATUS AND METHOD OF FORMING A CONTINUOUS LAYER OF THERMOPLASTIC MATERIAL

[75] Inventors: Eugenio Millevoi, Fort Lee; Paul S. Brydel, Rockaway, both of N.J.

[73] Assignee: Sano, Inc., Passaic, N.J.

[21] Appl. No.: 407,898

[22] Filed: Sep. 15, 1989

[51] Int. Cl.$^5$ .............................................. B29C 47/88
[52] U.S. Cl. ................................ 264/211.12; 264/216; 425/224
[58] Field of Search ............... 264/216, 212, 556, 555, 264/211.12; 425/224

[56] References Cited

U.S. PATENT DOCUMENTS

| | | | |
|---|---|---|---|
| 2,965,927 | 12/1960 | Crosby et al. | 425/224 |
| 3,121,915 | 2/1964 | Heller, Jr. | 264/556 |
| 3,154,608 | 10/1919 | Aronsen | 264/101 |
| 3,347,962 | 10/1967 | Dieck et al. | 425/224 |
| 3,579,734 | 5/1971 | Mehta | 425/224 |
| 3,733,711 | 5/1973 | Haythornthwaite | 34/23 |
| 4,034,905 | 7/1977 | Lansmich | 226/195 |
| 4,038,354 | 7/1977 | Remmington et al. | 264/216 |

FOREIGN PATENT DOCUMENTS

| | | | |
|---|---|---|---|
| 2505252 | 11/1982 | France | 264/212 |
| 48-2218 | 1/1973 | Japan | 264/216 |
| 53-129252 | 11/1978 | Japan | 264/216 |
| 1064272 | 4/1967 | United Kingdom | 264/556 |

Primary Examiner—Jeffery Thurlow
Attorney, Agent, or Firm—Lerner, David, Littenberg, Krumholz & Mentlik

[57] ABSTRACT

In a cast film process, a thin sheet of semi-molten resin is extruded from a die and directed onto a rotating cylinder such that the transverse length of the sheet and the rotational axis of the cylinder are parallel to one another. During this stage of the process, it is desired to prevent air from entering and subsequently being trapped between the film and the casting surface of the rotating cylinder. Ultimately, entrapped air results in localized film distortion and non-uniform heat dissipation from the film. The cast film process employs an air deflector to deflect this laminar air flow layer which is entrained with the surface of the rotating cylinder before it can be forced between the casting surface and the film. The elimination or substantial reduction of the tangential velocity of the entrained air layer provides more uniform adherence of the extruded film to the casting surface.

36 Claims, 4 Drawing Sheets

APPARATUS AND METHOD OF FORMING A CONTINUOUS LAYER OF THERMOPLASTIC MATERIAL

BACKGROUND OF THE INVENTION

The present invention relates in general to an apparatus and method of forming a continuous layer of thermoplastic material, and more particularly, to such an apparatus and method which enhances film quality and formation by eliminating localized film distortion and non-uniform heat dissipation during the film casting process.

In a film casting process, a thin sheet of molten thermoplastic material is extruded from a die and directed onto a continuously rotating casting surface, such as the surface of a highly polished metal cylinder or roll. During the casting process, the opening of the extrusion die is arranged such that the transverse length of the molten thermoplastic material and the longitudinal center line of the casting cylinder are parallel to one another. During this stage of the casting process, air or other gases should be prevented from entering and subsequently being trapped between the cast film and the surface of the rotating casting cylinder. In this regard, it is known that a rotating cylinder will entrain a layer of air along its outer surface. Ultimately, trapped air between the cast film and the surface of the rotating cylinder will result in localized film distortion and non-uniform heat dissipation during solidification of the film.

U.S. Pat. No. 3,154,608 has recognized that if too much air or smoke from molten polyolefin material becomes trapped between the surface of the casting cylinder and the polyolefin film, the optical properties of the resulting film are adversely effected. The adverse effects resulting from trapped air or smoke is avoided by providing a vacuum chamber or suction box located between the extrusion die and the moving surface of the casting cylinder. By maintaining a partial vacuum within this region, there is minimized the trapping of air between the extruded polyolefin material and the casting surface which would otherwise impair optical properties of the formed film. The creation of a partial vacuum is also disclosed to have the effect of withdrawing smoke generated by the hot extruded polyolefin material which, if trapped between the material and the casting surface, would also impair optical properties of the resulting film. In addition to these vacuum devices being relatively expensive, it is known that the removal of an entrained air layer by means of such a device necessitates that the vacuum level be adjusted accurately to prevent a potentially high vacuum from inducing the molten polyolefin film to bend backwards towards the vacuum device and, therefore, adversely effecting its uniform formation and resulting film qualities.

Attempts have been made in the paper making industry to employ other devices to cause a web of paper to contact a greater portion of the circumferential surface of a cylinder or the planar surface of a guide table. For example, there is known from U.S. Pat. No. 3,733,711 the use of one or more air foils on one side or the other of a web to create either a localized positive or negative pressure. In the case of a positive pressure, the web is forced into greater contact with the surface of the cylinder, while in the case of a negative pressure, the web is sucked against a corresponding greater portion of the cylinder. In either case, there has been no attempt to eliminate the layer of entrained air which results from rotation of the cylinder. Similarly, there is known from U.S. Pat. No. 4,034,905 the use of an air foil to create a vacuum between a continuously moving web and an underlying guide table to allow web supply over a relatively long distance, at increased speed, without vibration and undesirable flutter of the web.

However, in these known apparatuses, air foils are relatively large and accordingly difficult to position in a region of limited space or one occupied by other devices. In the case of a film casting process, unlike that in a paper making process, this region is also occupied by a relatively large extrusion die, typically positioned from about 3 to 20 inches from the casting cylinder. Accordingly, there is an unsolved need for a device which is operable to deflect the layer of entrained air from the surface of a casting cylinder, and which can be easily positioned within a region of limited space, and in particular, one which includes an extrusion die for forming a continuous layer or film of thermoplastic material.

SUMMARY OF THE INVENTION

One object of the present invention is to provide an apparatus and method of forming a continuous layer of thermoplastic material without the necessity of employing vacuum devices and the like.

Another object of the present invention is to provide an apparatus and method of forming a continuous layer of thermoplastic material which is inexpensive to manufacture and which is easy to use.

Another object of the present invention is to provide an apparatus and method of forming a continuous layer of thermoplastic material which prevents localized film distortion and non-uniform heat dissipation during solidification of the cast molten film.

Another object of the present invention is to provide an apparatus and method of forming a continuous layer of thermoplastic material which utilizes deflection techniques to eliminate entrained laminar air flow along the surface of the rotating casting cylinder.

In accordance with one embodiment of the present invention, there is disclosed an apparatus for forming a continuous layer of material, the apparatus is constructed of a movable surface supporting a layer of entrained air, supplying means for supplying a layer of material onto the surface, and deflecting means arranged adjacent the surface for deflecting the layer of entrained air from the surface to prevent a substantial portion of the layer of entrained air from being trapped between the layer of material and the surface.

In accordance with another embodiment of the present invention, there is disclosed an apparatus for forming a continuous layer of material, the apparatus is constructed of a movable surface supporting a layer of entrained air having an initial tangential velocity, supplying means for supplying a layer of material onto the surface, and deflecting means arranged adjacent the surface for deflecting the layer of entrained air from the surface whereby the velocity of the layer of entrained air immediately adjacent the junction of the layer of material and the surface is less then about 50 percent of the initial tangential velocity.

In accordance with another embodiment of the present invention, there is disclosed a method of forming a continuous layer of plastic material, the method includes extruding a layer of plastic material onto a moving casting surface supporting a layer of entrained air, and deflecting the layer of entrained air from the casting surface to prevent a substantial portion of the layer of entrained air from being trapped between the layer of plastic material and the casting surface.

In accordance with another embodiment of the present invention, there is disclosed a method of forming a continuous layer of plastic material, the method includes extruding a layer of plastic material onto a moving casting surface supporting a layer of entrained air having an initial tangential velocity, deflecting the layer of entrained air from the casting surface whereby the velocity of the layer of entrained air immediately adjacent the junction of the extruded layer of plastic material and the casting surface is less then about 50 percent of the initial tangential velocity.

In accordance with another embodiment of the present invention, there is disclosed an apparatus for maintaining contact of a continuous layer of material with moving cylindrical surface supporting a layer of entrained air, the apparatus constructed of a deflecting device arranged adjacent the surface for deflecting the layer of entrained air from the surface to prevent a substantial portion of the layer of entrained air from being trapped between the layer of material and the surface.

In accordance with another embodiment of the present invention, there is disclosed an apparatus for maintaining contact of a continuous layer of material with a moving cylindrical surface supporting a layer of entrained air having an initial tangential velocity, the apparatus constructed of a deflecting device arranged adjacent the surface for deflecting the layer of entrained air from the surface whereby the velocity of the layer of air immediately adjacent the junction of the layer of material and the surface is less than about 50 percent of the initial tangential velocity.

BRIEF DESCRIPTION OF THE DRAWINGS

The above description, as well as further objects, features and advantages of the present invention will be more fully understood with reference to the following detailed description of an apparatus and method of forming a continuous layer of thermoplastic material, when taken in conjunction with the accompanying drawings, wherein:

FIG. 1 is a perspective diagrammatic view illustrating the broad principles of the apparatus and method of the present invention for forming a continuous layer of thermoplastic material in the nature of an extruded film and the like;

DETAILED DESCRIPTION

Figure 1:
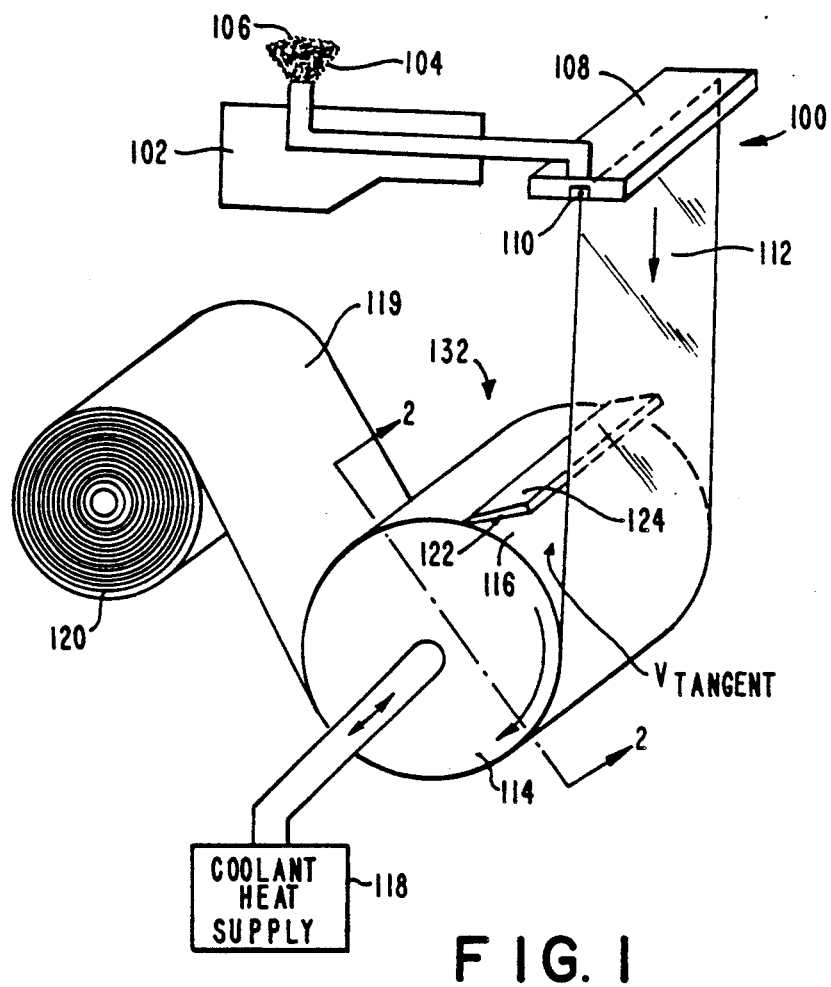

Referring now to the drawings, wherein like reference numerals represent like elements, there is shown diagrammatically in FIG. 1 an apparatus for forming a continuous layer of thermoplastic material, and which has been designated generally by reference numeral 100. The apparatus 100 includes a polymer extruder 102 having a supply hopper 104 containing a polymer 106 to be cast into a thin film by the extrusion apparatus. The polymer 106 is heated to a molten state within the extruder 102 and forced under high pressure through an extrusion die 108. The extrusion die 108 has an elongated slotted opening 110 through which a thin film 112 of polymer in a semi-molten state is progressively advanced. A cylindrical chill roll 114 having a smooth polished casting surface 116 of up to about 80 inches in width is rotationally arranged adjacent the extrusion die 108. The chill roll 114 is driven for rotation by a drive assembly (not shown) which may be of conventional design. The temperature of the casting surface 116 may be maintained, if desired, at a temperature, for example, in the range of about 40°-100° F. by means of recirculated fluid from coolant/heat supply 118. The solidified film 119 is peeled off the casting surface 116 of the chill roll 114 and is taken up in the form of a continuous roll 120. The construction of the apparatus 100 as thus far described is generally known for extruding a continuous film of thermoplastic material.

Figure 2:
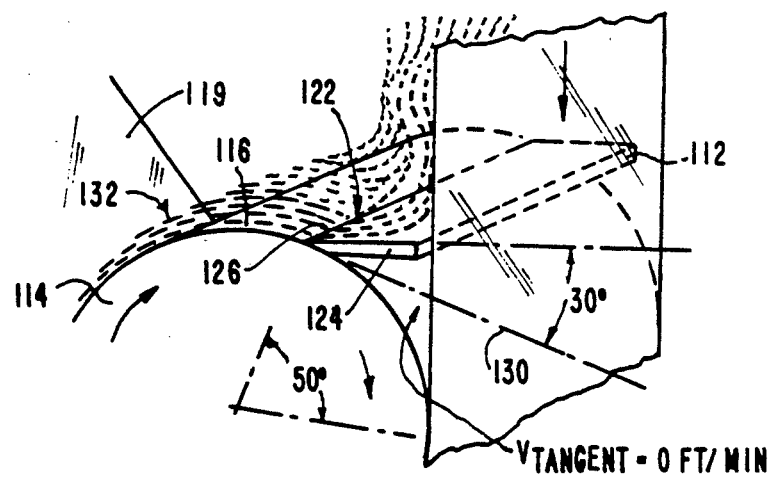
FIG. 2 is an enlarged perspective diagrammatic view taken along line 2—2 in FIG. 1 illustrating the operative principles of the air displacement device in accordance with the present invention in greater detail.

In accordance with the present invention, an air deflector 122 is positioned in contact with the casting surface 116 of the chill roll 114 at a predetermined radial location with respect to the extruded semi-molten film 112. The air deflector 122 eliminates the entrained air layer about the chill roll 114 so as to eliminate localized film distortion and non-uniform heat dissipation during the film casting process. The operative principles of the air deflector 122 will now be described with reference to FIGS. 2 thru 4. As generally shown in FIG. 2, the air deflector 122 is constructed as a longitudinal body 124 extending transversely of the casting surface 116. The leading edge 126 of the air deflector 122 is positioned in contact with the casting surface 116 and parallel to the rotational axis of the chill roll 114 and to the plane of the extruded semi-molten film 112. Although not clearly shown, the leading edge 126 may be of a variety of shapes, for example, beveled, pointed, rounded, chiseled and the like.

Figure 3:
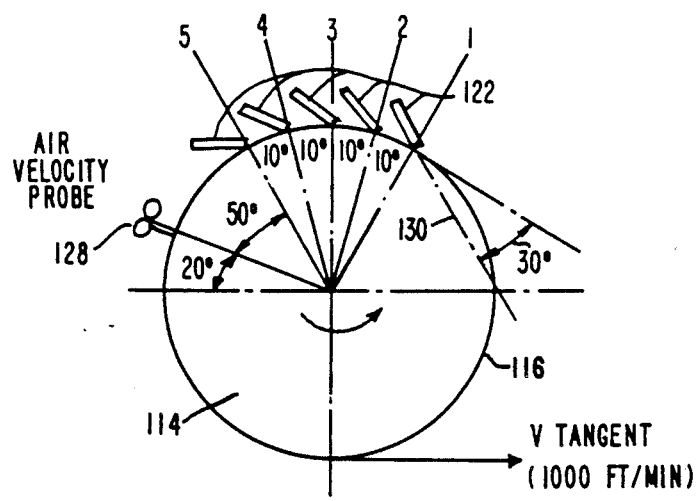
FIG. 3 is a diagrammatic illustration of an experimental apparatus used in determining the velocity of the entrained air layer as a function of the position of the air displacement device.

An air deflector 122 of the foregoing type was used to investigate the force a layer of trapped air would exert on the semi-molten film 112 as it contacts the chill roll 114 as a function of surface tangential velocity, and to determine a technique to deflect this laminar air flow layer which travels with the surface of the rotating chill roll before it can be forced between the film and the casting surface 116. Referring to FIG. 3, a rotating chill roll 14 having a surface tangential velocity of 1,000 ft/min. and a diameter of 12.6 inches was equipped with a surface air velocity probe 128 operative to measure the velocity of the entrained air layer. The probe 128 was positioned on the casting surface 116 at a radial position of about 20° from the horizontal, that is, at the point of contact of the semi-molten film 112 (not shown).

An air deflector 122 was positioned in contact with the casting surface 116 so as to form an angle of about 30° with respect to its tangent 130. The velocity of the entrained air layer was measured by probe 128 in the absence of an air deflector 122 as a reference point, and in the presence of an air deflector located at 90°, 80°, 70°, 60° and 50° from the location of the probe. The results of the measured air velocity is shown in the following table. However, it is to be understood that the measured air velocity is a direct function of the surface tangential velocity of the casting roll 114 and will change accordingly with the casting roll diameter and rotational speed, i.e., RPM.

TABLE I

| DEFLECTOR POSITION | AIR VELOCITY FT/MIN |
|---|---|
| NO DEFLECTOR | 210–230 |
| 1 (90°) | 210–230 |
| 2 (80°) | 210–230 |
| 3 (70°) | 125 |
| 4 (60°) | 75 |
| 5 (50°) | ZERO |

As evident from the experimental result, the position of an air deflector 122 at a radial location of less than about 50° will result in a measured velocity of the air layer of about zero ft/min. As diagrammatically illustrated in FIG. 2, the entrained air layer 132 is completely deflected and diffused by the air deflector 122 at this radial position such that $V_{tangent}$ is equal to about zero ft/min within the region between the air deflector and the semi-molten film 112.

From Table I, the preferred location for the air deflector 122 is at a radial position of less than about 50° from the junction of the semi-molten film 112 with the casting surface 116. However, it is to be understood that positioning the air deflector 122 at a radial position which will reduce the tangential velocity of the entrained air layer will also provide enhancement in the film casting process. For example, reducing the velocity of the entrained air layer 132 to less than about 50 percent of its initialed velocity will greatly improve the heat transfer properties of the film casting process and the quality of the resulting solidified film 119. It is thus contemplated that other radial positions for the location of the air deflector 122 may be utilized from that specifically preferred herein. In addition, the preferred radial location is based upon the above-noted parameters and specifications for the apparatus 100. Thus, modifications to the apparatus 100 or air deflector 122 design, as well as variations in the tangential velocity of the chill roll 114 may affect the preferred radial position of the air deflector for optimum performance, i.e., tangential velocity of the entrained air layer of about zero ft/min. The precise radial position of the air deflector 122 for any given apparatus 100 and under any given operating conditions of the film casting process may be obtained by trial and error in accordance with the procedure described hereinabove. Further in addition, although the air deflector 122 has been described as being arranged at approximately 30° to its tangent, other angular relationships are contemplated without departing from the spirit and scope of the present invention.

It is known that the velocity of an entrained air layer decreases with its increasing radial distance from the moving surface. Using the chill roll 114 as shown in FIG. 3, the tangential velocity of the entrained air layer was measured using probe 128 as a function of radial distance from the casting surface 116. The results of this experiment are shown in Table II.

TABLE II

| RADIAL DISTANCE INCHES | AIR VELOCITY FT/MIN |
|---|---|
| .020 | 220–240 |
| .060 | 220–240 |
| .100 | 210–230 |
| .200 | 180–200 |
| .300 | 150–170 |
| .400 | 140–160 |
| .500 | 120–140 |
| .600 | 100–120 |
| .800 | 90–110 |
| 1.000 | 60–80 |

Based on these results, the leading edge 126 of the air deflector 122 is positioned as close as possible to the casting surface 116, and preferably in direct contact therewith so as to deflect the entrained air layer.

Figure 4:
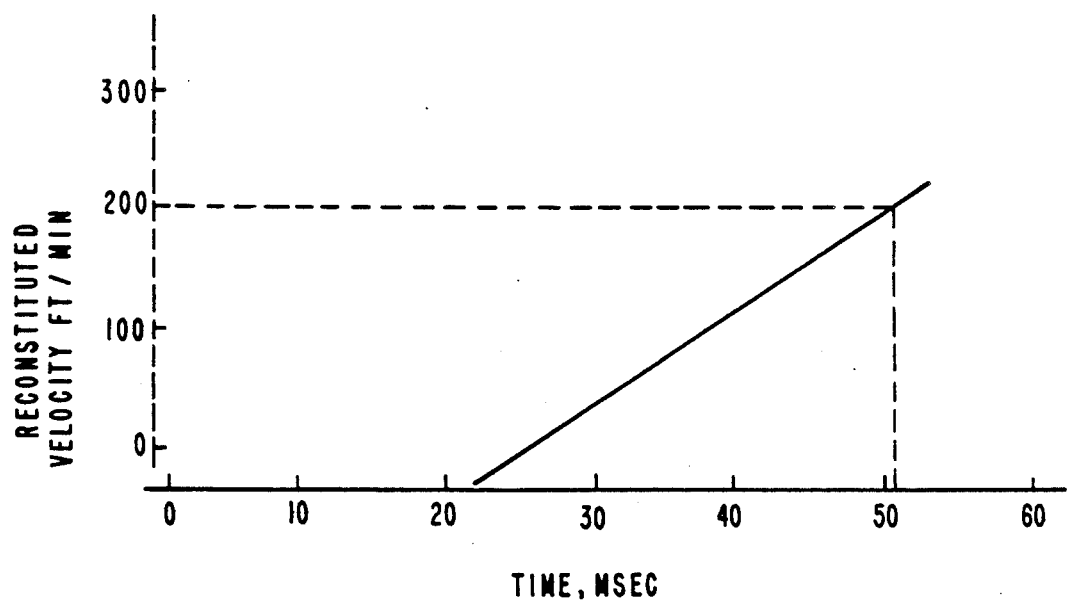
FIG. 4 is a graph illustrating the relationship between reconstituted air velocity and time.

Referring to FIG. 4, the time for the air layer being entrained by the rotating chill roll 114 to reconstitute itself after a tangential velocity of about zero ft/min is plotted as a function of time. As shown, an air velocity of 200 ft/min. of the entrained air layer is attained after about 51 milliseconds. Using the above recorded experimental data, an apparatus 100 and method of forming a continuous layer of film of plastic material can be devised utilizing an air deflector 122 in accordance with the present invention.

Figure 5:
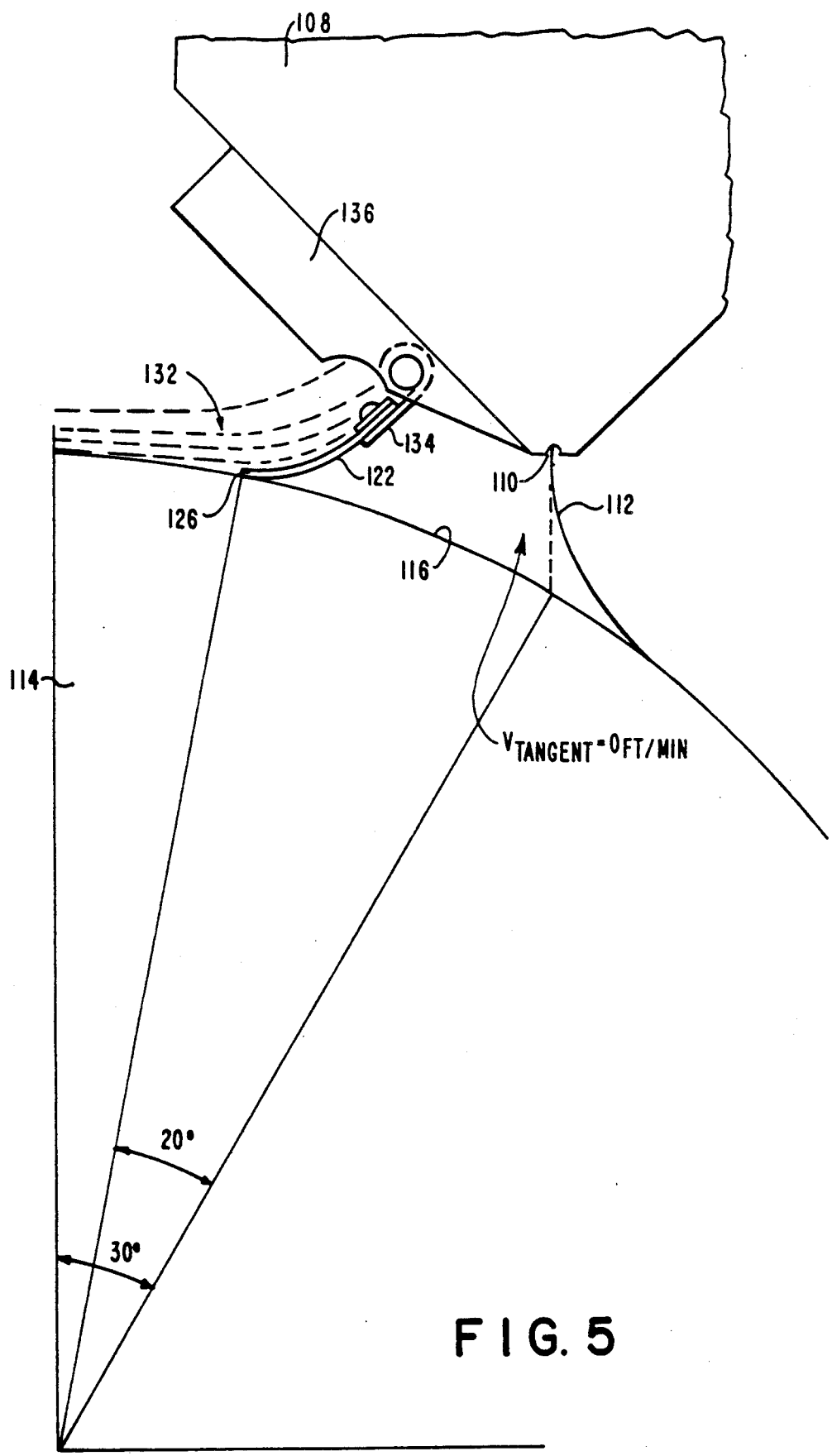
FIG. 5 is a partial front elevational view illustrating the arrangement of the air displacement device in relationship to the extrusion die in accordance with one embodiment of the present invention.

Referring now to FIG. 5, there is shown a commercial embodiment of an apparatus 100 in accordance with one arrangement of the present invention. The apparatus 100 including an air deflector 122 is adapted to manufacture extruded film from a variety of low to high molecular weight polymers. For example, such polymers include high density polyethylene, linear low density polyethylene, polypropylene, low density polypropylene, polystyrene, PVC, polycarbonate, polysulfone, polyester, polyolefin, nylon and the like. The air deflector 122 can be constructed from a variety of materials, for example, Teflon, berillium-copper, polypropylene or any plastic or polymer coated metal and the like. In accordance with the preferred embodiment, the air deflector 122 is constructed from polypropylene so as to be flexible and to prevent wear or scratching of the casting surface 116 of the chill roll 114 which is typically highly polished. The air deflector 122 is attached to a rotationally positionable mounting bracket 134, which in turn is attached to a roll guard 136 secured to the underside of the extrusion die 108.

The chill roll 114 has a diameter of about 23.75 inches and a transverse length of up to about 80 inches. The extrusion die 108 is arranged overlying the casting surface 116 such that opening 110 is positioned at a location of approximately 30° from vertical. The extruded semi-molten film 112 will therefore contact the casting surface 116 at a location of approximately 32°–35° from vertical. The contact location of the molten film 112 on the casting surface 116 of the chill roll 114 is, in part, dependent on the speed of rotation of the chill roll, viscosity of the molten film, etc. As a result of this arrangement, the leading edge 126 of the air deflector 122 contacts the casting surface 116 at a radial location of about 10° from vertical or about 22°–25° from the point of contact of the extruded semi-molten film 112 with the casting surface. The opening 110 of the extrusion die 108 is spaced from the casting surface 116 approximately 4 inches. As a result of this arrangement, and due to the flexible nature of the air deflector 122, the air deflector assumes an arcuate shape so as to enhance deflection of the entrained air layer 132 away from the casting surface 116. As a result, the tangential velocity of the air layer between the air deflector 122 and the extruded semi-molten film 122 is about zero ft/min.

Figure 6:
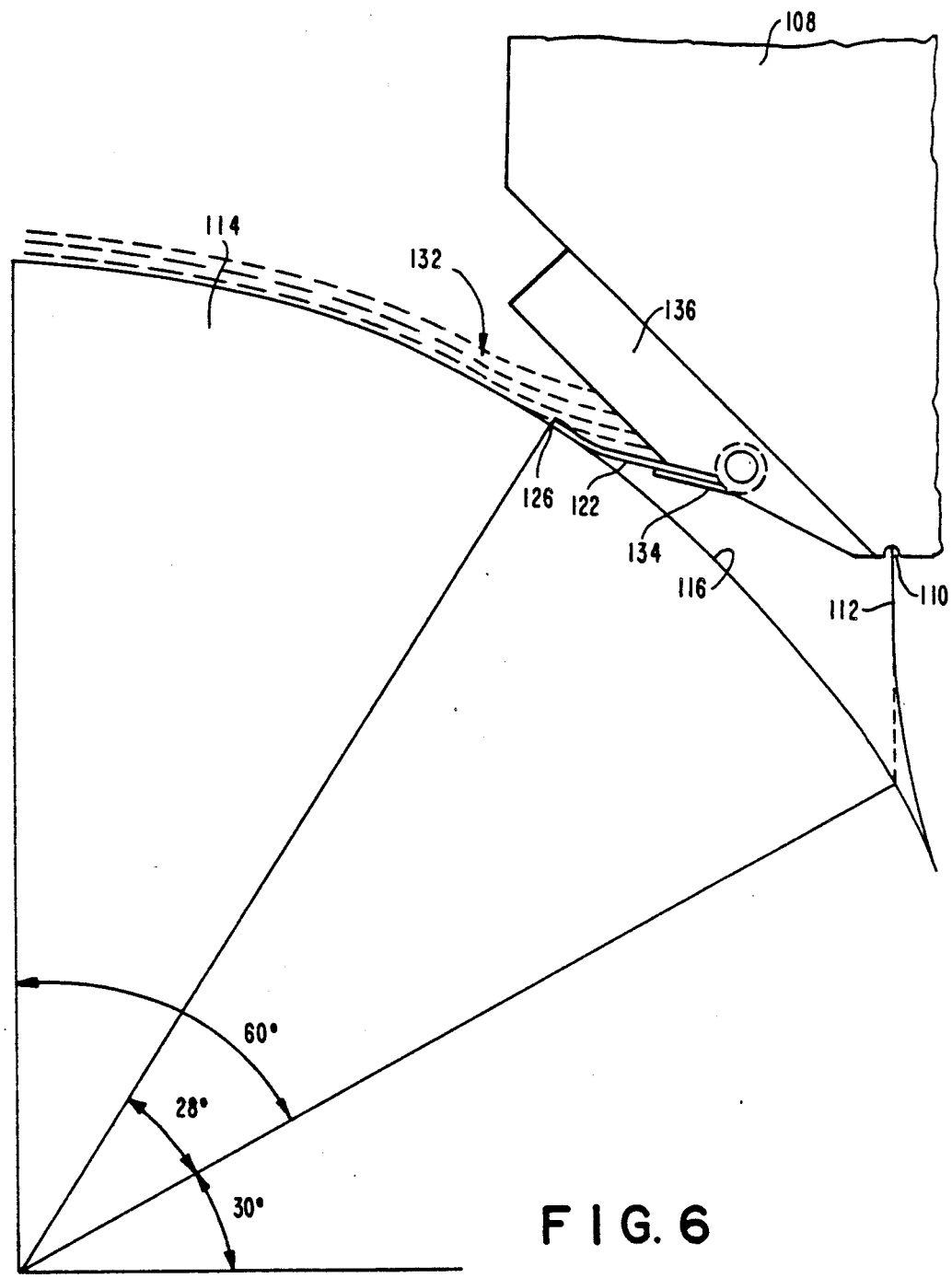
FIG. 6 is a partial front elevational view illustrating the arrangement of the air displacement device in relationship to the extrusion die in accordance with another embodiment of the present invention.

Referring now to FIG. 6, a commercial embodiment of an apparatus 100 in accordance with another arrangement of the present invention is shown where the angle of attack of the extruded semi-molten film 112 with the casting surface 116 has been altered. The extrusion die 108 is arranged such that opening 110 is positioned at a location of approximately 60° from vertical. The extruded semi-molten film 112 will therefore contact the casting surface 116 at a radial location of approximately 62°-65° from vertical. By changing the angle of attack, one can control the neck-in tendency of extruded films, i.e, the reduction in film width caused by the extruded semi-molten film 112 being drawn down between the extrusion die 108 and the chill roll 114. This is also used to control film properties. The leading edge 126 of the air deflector 122 contacts the casting surface 116 at a radial location of approximately 32° from vertical or about 30°-33° from the point of contact of the extruded semi-molten film 112 with the casting surface. The opening 110 of the extrusion die 108 is positioned overlying the casting surface 116 at a distance of approximately 5 inches. The air deflector 122, due to its flexible nature, is curved into an arcuate shape of greater radius then the embodiment disclosed in FIG. 5. As a consequence, a greater portion of the air deflector 122 is arranged in surface contact with the casting surface 116. However, either embodiment is effective in reducing the tangential air velocity of the air layer proximate the junction of the extruded semi-molten film 112 with the casting surface 116 to about zero ft/min.

Although the apparatus 100 and method of forming a continuous layer of thermoplastic material has been described with respect to a single extruded semi-molten film 112, it is to be understood that coextrusion of thermoplastic material is contemplated. Coextrusion is the process of simultaneously extruding two or more polymer layers from two or more extruders from one die system to produce a multi-layered coating. Such a process allows a very thin skin layer of an expensive functional copolymer to be combined with a relatively inexpensive polymer for the bulk of the coating.

Although the invention herein has been described with references to particular embodiments, it is to be understood that the embodiments are merely illustrative of the principles and application of the present invention. For example, the substantial elimination of the entrained air layer permits the use of a non-driven idler roller in material handling systems for continuous layers or films of various materials, such as plastics, paper and the like. In this regard, the maintaining of substantial surface contact of the material layer or film with the idler roller eliminates the need for independent idler drive mechanisms, i.e., the advancing of the material layer or film functions to drive the idler roller. In such an arrangement, it is contemplated that the leading edge 126 of the air deflector 122 will be positioned slightly above the surface of the idler roller to eliminate frictional resistance therebetween. It is therefore to be understood that numerous modifications may be made to the embodiments and that other arrangements may be devised without departing from the spirit and scope of the present invention as defined by the claims.

What is claimed is:

1. An apparatus for forming a continuous layer of material, said apparatus comprising a movable surface supporting a layer of entrained air, supplying means for supplying a layer of material onto said surface, and deflecting means arranged adjacent said surface proximate the junction of said layer of material and said surface for deflecting said layer of entrained air from said surface to prevent a substantial portion of said layer of entrained air from being trapped between said layer of material and said surface in the absence of an applied vacuum thereat, said deflecting means including a longitudinal member arranged across said surface and having an air deflecting surface arranged at an angle thereto, said member including a leading edge positioned adjacent said surface in a direction facing opposite to the direction of movement of said surface whereby said layer of entrained air is deflected by said leading edge and along said air deflecting surface away from said movable surface.

2. The apparatus of claim 1, wherein said material comprises plastic material.

3. The apparatus of claim 2, wherein said supplying means includes a die for extruding said layer of plastic material in the form of a film.

4. The apparatus of claim 1, wherein said surface comprises the surface of a rotary cylinder.

5. The apparatus of claim 1, wherein said longitudinal member has a width corresponding substantially to the width of said layer of said material.

6. The apparatus of claim 1, wherein said leading edge is arranged substantially parallel to said layer of said material at said junction and to the axis of rotation of the surface.

7. The apparatus of claim 1, wherein said leading edge is in contact with said surface.

8. The apparatus of claim 1, wherein said deflecting means is constructed of polypropylene material.

9. The apparatus of claim 1, wherein said deflecting means is attached to said supplying means.

10. An apparatus for forming a continuous layer of material, said apparatus comprising a movable surface supporting a layer of entrained air having an initial tangential velocity, supplying means for supplying a layer of material onto said surface, and deflecting means arranged adjacent said surface proximate the junction of said layer of material and said surface for deflecting said layer of entrained air from said surface in the absence of an applied vacuum thereat, whereby the velocity of said layer of air immediately adjacent said junction of the layer of material and said surface is less than about 50 percent of said initial tangential velocity, said deflecting means including a longitudinal member arranged across said surface and having an air deflecting surface arranged at an angle thereto, said member including a leading edge positioned adjacent said surface in a direction facing opposite to the direction of movement of said surface whereby said layer of entrained air is deflected by said leading edge and along said air deflecting surface away from said movable surface.

11. The apparatus of claim 10, wherein said material comprises plastic material.

12. The apparatus of claim 11, wherein said supplying means includes a die for extruding said layer of plastic material in the form of a film.

13. The apparatus of claim 10, wherein said surface comprises the surface of a rotary cylinder.

14. The apparatus of claim 10, wherein said longitudinal member has a width corresponding substantially to the width of said layer of said material.

15. The apparatus of claim 10, wherein said leading edge is arranged substantially parallel to said layer of said material at said junction and to the axis of rotation of the surface.

16. The apparatus of claim 10, wherein said leading edge is in contact with said surface.

17. The apparatus of claim 10, wherein said deflecting means is constructed of polypropylene material.

18. The apparatus of claim 10, wherein said deflecting means is attached to said supplying means.

19. The apparatus of claim 10, wherein said velocity is reduced by said deflecting means to about zero ft/min.

20. The apparatus of claim 10, wherein said deflecting means is positioned at a location of less than about 50° from the point of contact of the layer of material with said surface.

21. A method of forming a continuous layer of plastic material, said method comprising extruding a layer of plastic material onto a moving casting surface supporting a layer of entrained air, and deflecting said layer of entrained air from said casting surface proximate the junction of the extruded layer of plastic material and said casting surface to prevent a substantial portion of said layer of entrained air from being trapped between said layer of plastic material and said casting surface in the absence of an applied vacuum thereat, said deflecting comprising arranging a longitudinal member having a leading edge across said casting surface and having an air deflecting surface arranged at an angle thereto, and positioning the leading edge in a direction facing opposite to the direction of movement of the casting surface whereby said layer of entrained air is deflected by said leading edge and along said air deflection surface away from said movable surface.

22. The method of claim 21, further including arranging the member across substantially the entire width of the layer of plastic material.

23. The method of claim 21, further including arranging the leading edge of the member substantially parallel to said layer of said plastic material at said junction and to the axis of rotation of the casting surface.

24. The method of claim 23, further including arranging the leading edge of the member in contact with the casting surface.

25. A method of forming a continuous layer of plastic material, said method comprising extruding a layer of plastic material onto a moving casting surface supporting a layer of entrained air having an initial tangential velocity and, deflecting said layer of entrained air from said casting surface proximate the junction of the extruded layer of plastic material and said casting surface in the absence of an applied vacuum thereat, whereby the velocity of said layer of air immediately adjacent said junction of the extruded layer of plastic material and said casting surface is less than about 50 percent of said initial tangential velocity, said deflecting comprising arranging a longitudinal member having a leading edge across said casting surface and having an air deflecting surface arranged at an angle thereto, and positioning the leading edge in a direction facing opposite to the direction of movement of the casting surface whereby said layer of entrained air is deflected by said leading edge and along said air deflecting surface away from said movable surface.

26. The method of claim 25, further including arranging the member across substantially the entire width of the layer of plastic material.

27. The method of claim 25, further including arranging the member substantially parallel to said layer of said plastic material at said junction and to the axis of rotation of the casting surface.

28. The method of claim 27, further including arranging the leading edge of the member in contact with the casting surface.

29. The method of claim 25, wherein said velocity is reduced by said deflecting to about zero ft/min.

30. The method of claim 25, wherein said deflecting takes place at a radial position of less then about 50° from the point of contact of the layer of plastic material with the casting surface.

31. An apparatus for maintaining contact of a continuous layer of material with a moving cylindrical surface supporting a layer of entrained air, said apparatus comprising a deflecting device arranged adjacent said surface proximate the junction of the layer of material and said surface for deflecting said layer of entrained air from said surface to prevent a substantial portion of said layer of entrained air from being trapped between said layer of material and said surface in the absence of an applied vacuum thereat, said deflecting device including a longitudinal member arranged across said surface and having an air deflecting surface arranged at an angle thereto, said member including a leading edge positioned adjacent said surface in a direction facing opposite to the direction of movement of said surface whereby said layer of entrained air is deflected by said leading edge and along said air deflection surface away from said movable surface.

32. The apparatus of claim 31, wherein said layer of material comprises a film of plastic material.

33. The apparatus of claim 31, wherein said leading edge is arranged substantially parallel to said layer of said material at said junction and to the axis of rotation of the surface.

34. An apparatus for maintaining contact of a continuous layer of material with a moving cylindrical surface supporting a layer of entrained air having an initial tangential velocity, said apparatus comprising a deflecting device arranged adjacent said surface proximate the junction of the layer of material and said surface for deflecting said layer of entrained air from said surface in the absence of an applied vacuum thereat, whereby the velocity of said layer of air immediately adjacent the junction of the layer of material and said surface is less than about 50 percent of said initial tangential velocity, said deflecting device including a longitudinal member arranged across said surface and having an air deflecting surface arranged at an angle thereto, said member including a leading edge positioned adjacent said surface in a direction facing opposite to the direction of movement of said surface whereby said layer of entrained air is deflected by said leading edge and along said air deflection surface away from said movable surface.

35. The apparatus of claim 34, wherein said layer of material comprises a film of plastic material.

36. The apparatus of claim 34, wherein said leading edge is arranged substantially parallel to said layer of said material at said junction and to the axis of rotation of the surface.

* * * * *